(12) United States Patent
Canard et al.

(10) Patent No.: US 6,355,720 B1
(45) Date of Patent: Mar. 12, 2002

(54) LATEX FORMULATIONS WITH REDUCED YELLOWING

(75) Inventors: Gregory M. Canard, Racine, WI (US); James W. Taylor, Gurnee, IL (US); David L. Trumbo, Racine, WI (US)

(73) Assignee: Johnson Polymer, Inc., Sturtevant, WI (US)

( * ) Notice: Subject to any disclaimer, the term of this patent is extended or adjusted under 35 U.S.C. 154(b) by 0 days.

(21) Appl. No.: 09/570,199

(22) Filed: May 12, 2000

(51) Int. Cl.$^7$ .................................................. C08K 3/02
(52) U.S. Cl. ....................................... 524/501; 523/201
(58) Field of Search ........................... 524/501; 523/201

(56) References Cited

U.S. PATENT DOCUMENTS

| | | |
|---|---|---|
| 3,914,338 A | 10/1975 | Krieg et al. |
| 4,133,788 A | 1/1979 | Sahajpal et al. |
| 4,226,752 A | 10/1980 | Erickson et al. |
| 4,391,928 A | 7/1983 | Herman et al. |
| 4,537,916 A | 8/1985 | Bruschtein et al. |
| 4,683,269 A | 7/1987 | Aksman et al. |
| 4,717,750 A | 1/1988 | Makati et al. |
| 4,876,313 A | 10/1989 | Lorah |
| 4,906,684 A * | 3/1990 | Say .............................. 524/548 |
| 4,939,190 A | 7/1990 | Tomioka et al. |
| 4,942,201 A | 7/1990 | Briggs et al. |
| 5,053,441 A | 10/1991 | Baile |
| 5,106,903 A | 4/1992 | Vanderhoff et al. |
| 5,212,251 A | 5/1993 | Lorah et al. |
| 5,219,900 A | 6/1993 | Davies et al. |
| 5,498,659 A | 3/1996 | Esser |
| 5,561,034 A * | 10/1996 | Desie .......................... 430/536 |
| 5,605,722 A | 2/1997 | Esser |
| 5,605,952 A | 2/1997 | Esser |
| 5,605,953 A | 2/1997 | Esser |
| 5,609,965 A | 3/1997 | Esser |
| 5,962,571 A * | 10/1999 | Overbeek ................... 524/460 |
| 6,028,155 A * | 2/2000 | Collins ........................ 526/270 |

* cited by examiner

*Primary Examiner*—Paul R. Michl
(74) *Attorney, Agent, or Firm*—Renee J. Rymarz; Neil E. Hamilton; Warren R. Bovee

(57) ABSTRACT

Latex formulations which exhibit a reduced amount of yellowing when exposed to heat, aldehydes or ultraviolet light contain polyfunctional amines, reducing agents, and/or reduced levels of styrene.

72 Claims, No Drawings

LATEX FORMULATIONS WITH REDUCED YELLOWING

FIELD OF THE INVENTION

This invention relates to non-yellowing latex formulations and more particularly relates to latex formulations which exhibit a reduced amount of yellowing when exposed to heat, aldehydes or ultraviolet light.

BACKGROUND OF THE INVENTION

Polymers prepared by emulsion polymerization are used in a wide variety of applications. For example, latex formulations prepared by emulsion polymerization are used in paints, polishes, finishes, films, inks, clear coats, stains, varnishes, overprint varnishes, and powder coatings.

It has long been known that latex formulations are prone to substantial yellowing when exposed to heat, aldehydes or light, especially ultraviolet light. Bluing agents may be added to yellowed polymers in one approach that has long been used in polymer chemistry. However, this approach is remedial in nature and does not adequately address the source of the problem.

The yellowing of latex formulations is particularly problematic in clear coat formulations, especially when the formulation is to be used over lightly colored substrates such as white and cream-colored substrates. Additionally, yellowing of latex formulations has been problematic when such formulations are exposed to various aldehydes such as formaldehyde and benzaldehyde.

Therefore, a need exists for clear coat formulations which reduce or eliminate the amount of yellowing which is exhibited when such formulations are exposed to heat, aldehydes and ultraviolet light.

SUMMARY OF THE INVENTION

The present invention provides coating compositions which exhibit a reduced amount of yellowing when exposed to heat, aldehydes or ultraviolet light.

One aspect of the invention provides a latex formulation that exhibits reduced yellowing. The formulation includes a polymeric particle which includes a seed latex polymer that incorporates at least one monomer such as a vinyl aromatic monomer, an alkyl acrylate, an alkyl methacrylate, or combinations of these monomers. The polymeric particle also includes an inner polymer layer overlying at least a portion of the seed latex polymer. The inner polymer layer incorporates monomers including: an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomer, or combinations of these monomers. The polymeric particle additionally includes an outer polymer layer that includes less than about 5 percent, more preferably less than about 1 percent, by weight of total incorporated vinyl aromatic monomers and includes at least one incorporated monomer such as an alkyl acrylate monomer, an alkyl methacrylate monomer, and combinations of these monomers. The inner polymer layer is positioned between at least a portion of the seed latex polymer and the outer polymer layer and the polymeric particle exhibits reduced yellowing upon exposure to ultraviolet light.

In preferred latex formulations, the polymeric particle further includes at least one interstitial layer positioned between the inner polymer layer and the outer polymer layer. The interstitial polymer layer incorporates monomers including: an acetoacetoxy-containing monomer such as acetoacetoxyalkyl methacrylates, acetoacetoxyalkyl acrylates, and combinations of these monomers; an ethylenically unsaturated-ester containing monomer such as an alkyl acrylate, an alkyl methacrylate, and combinations of these monomers; and a diethylenically unsaturated monomer having the formula

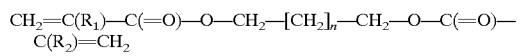

where $R_1$ and $R_2$ are independently either H or an alkyl group having from 1 to 5 carbon atoms and n is an integer ranging from 0 to 12. Preferred diethylenically unsaturated monomers include 1,10, decanediol diacrylate, 1,9-nonanediol diacrylate, 1,8-octanediol diacrylate, 1,7-heptanediol diacrylate, 1,6-hexanediol diacrylate, 1,5-pentanediol diacrylate, 1,4-butanediol diacrylate, 1,3-pentanedioldiacrylate, 1,2-ethanediol diacrylate, and combinations of these monomers. An especially preferred diethylenically unsaturated monomer incorporated in the interstitial polymer layer is 1,6-hexanediol diacrylate.

In other preferred latex formulations, the monomer incorporated in the outer polymer layer of the polymeric particle includes methyl methacrylate, 2-ethylhexyl acrylate, or combinations of these monomers.

Preferred latex formulations include a polyfunctional amine having at least two amine groups. In more preferred latex formulations, one of the amine groups on the polyfunctional amine is bonded to a first carbon atom and a second amine group is bonded to a second carbon atom and 3 or less or 6 or more carbon atoms separate the first carbon atom from the second carbon atom. Preferred polyfunctional amines include 1,2-diaminopropane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3-diaminohexane, 4-methyl-1,3-diaminohexane, 3-methyl-1,3-diaminohexane, 2-methyl-1,4-diaminohexane, 3-methyl-1,4-diaminohexane, 5-methyl-1,4-diaminohexane, 2-methyl-1,5-diaminohexane, 3-methyl-1,5-diaminohexane, 4-methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations of these. An especially preferred polyfunctional amine for inclusion in a latex formulation is 1,3-diaminopentane.

Still other preferred latex formulations of the present invention include reducing agents. A particularly preferred reducing agent is the metabisulfite anion which may be present as the sodium, potassium, lithium, ammonium, or other salt. Other more preferred latex formulations include a base such as ammonia, ammonium hydroxide, alkylamines, dialkylamines, trialkylamines, or combinations of these bases. Especially preferred bases for inclusion in latex formulations include ammonia, ammonium hydroxide, or combinations of these bases.

Another aspect of the invention provides a latex formulation that 5 exhibits reduced yellowing that includes a base, a polyfunctional amine having at least two amine groups, and a polymeric particle. One of the two amine groups of the polyfunctional amine is bonded to a first carbon atom and a second amine group is bonded to a second carbon atom and 3 or less or 6 or more carbon atoms separate the first carbon atom from the second carbon atom. The polymeric particle of the latex formulation includes a seed latex polymer that incorporates at least one monomer such as a vinyl aromatic monomer, an alkyl acrylate, an alkyl methacrylate, or combinations of these monomers. The polymeric particle also includes an inner polymer layer overlying at least a portion of the seed latex polymer. The inner polymer layer incorporates monomers including: an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomer, or combinations of these monomers. The polymeric particle additionally includes an outer polymer layer including at least one incorporated alkyl acrylate, alkyl methacrylate, or a combination of these monomers. The inner polymer layer is positioned between at least a portion of the seed latex polymer and the outer polymer layer and the latex formulation exhibits reduced yellowing upon exposure to heat.

In a preferred embodiment of the invention, the latex formulation described above includes an interstitial polymer layer positioned between the inner polymer layer and the outer polymer layer. The interstitial polymer layer has the same characteristics as that described above.

Another aspect of the invention provides latex formulations that exhibit reduced yellowing. These formulations include a base; water; a polyfunctional amine having at least two amine groups; and a polymeric particle. The polymeric particle of the latex comprises a polymer incorporating monomers comprising: an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomer, or combinations of these monomers, wherein the total amount of vinyl aromatic monomers is less than about 5 percent, more preferably less than about 1 percent based on the total weight of the polymeric particle. Most preferably, the polymer of the polymeric particle is essentially free of vinyl aromatic monomers. Preferred latex formulations include a diethylenically unsaturated monomer having the properties described above.

The invention also provides a latex formulation that exhibits reduced yellowing that includes a base; water; a polyfunctional amine having at least two amine groups, wherein one of the two amine groups of the polyfunctional amine is bonded to a first carbon atom and a second amine group is bonded to a second carbon atom and 3 or less or 6 or more carbon atoms separate the first carbon atom from the second carbon atom; and a polymeric particle. The polymeric particle of the latex includes a polymer incorporating monomers comprising: an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomer, or combinations of these monomers. Preferred latex formulations include a diethylenically unsaturated monomer having the properties described above.

Still other aspects of the invention provide a method for producing a polymeric particle that exhibits reduced yellowing. One of these methods includes: polymerizing a first monomer mixture in the presence of a seed latex polymer, a surfactant, water, and a radical polymerization initiator to form an inner polymer layer; and subsequently polymerizing a second monomer mixture in the presence of the surfactant, the radical polymerization initiator, and the inner polymer layer. The first monomer mixture includes an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomers, or combinations of these monomers. The second monomer mixture includes a monomer such as a vinyl aromatic monomer, an alkyl acrylate, an alkyl methacrylate, or combinations of these monomers, and the total amount of vinyl aromatic monomers is less than about 5 percent, preferably less than about 1 percent, based on the total weight of the second monomer mixture. In especially preferred methods, the second monomer mixture is essentially free of vinyl aromatic monomers.

A latex formulation is preferably prepared from the polymeric particle produced as described above by mixing a base and a polyfunctional amine with the polymeric particle. The base is preferably a base such as ammonia, ammonium hydroxide, or a mixture of these while the polyfunctional amine has at least two amine groups.

Yet other aspects of the invention provide methods for producing latex formulations that exhibit reduced yellowing. One method for producing such a latex formulation includes polymerizing a mixture of monomers in the presence of a surfactant, water, and a radical polymerization initiator to produce a polymerization mixture; and mixing a base and a polyfunctional amine having at least two amine groups with the polymerization mixture. The mixture of monomers includes an acetoacetoxy-containing monomer such as am acetoacetoxyalkyl acrylate, an acetoacetoxy methacrylate, or a combination of these monomers; an ethylenically unsaturated ester-containing monomer such as an alkyl acrylate, an alkyl methacrylate, or a combination of these monomers; and an ethylenically unsaturated monomer such as a vinyl aromatic monomer, an acrylic acid monomer; a methacrylic acid monomer, or combinations of these monomers. The total amount of vinyl aromatic monomers is less than bout 5 percent based on the total weight of monomers, but is more preferably less than about 1 percent based on the total weight of monomers. In an especially preferred method, the monomer mixture is essentially free of any vinyl aromatic monomers.

Another method for preparing a latex formulation that exhibits reduced yellowing includes polymerizing a mixture of monomers in the presence of a surfactant, water, and a radical polymerization initiator to produce a polymerization mixture; and mixing a base and a polyfunctional amine with the polymerization mixture. The polyfunctional diamine has at least two amine groups and at least one of the amine groups is bonded to a carbon atom that is bonded two at least two other carbon atoms. The mixture of monomers includes an acetoacetoxy-containing monomer such as an acetoacetoxyalkyl acrylate, an acetoacetoxy methacrylate, or a combination of these monomers; an ethylenically unsaturated ester-containing monomer such as an alkyl acrylate, an alkyl methacrylate, or a combination of these monomers; and an ethylenically unsaturated monomer such as a vinyl aromatic monomer, an acrylic acid monomer; a methacrylic acid monomer, or combinations of these monomers.

Still another method for preparing a latex formulation that exhibits reduced yellowing includes preparing an aqueous polymeric particle dispersion; and mixing a base and a polyfunctional diamine with the aqueous polymeric particle dispersion. The polyfunctional amine has at least two amine groups and one of the two amine groups of the polyfunctional amine is bonded to a first carbon atom and a second amine group is bonded to a second carbon atom and 3 or less or 6 or more carbon atoms separate the first carbon atom from the second carbon atom. The preparation of the aqueous polymeric particle includes polymerizing a first monomer mixture in the presence of a seed latex polymer, water, a surfactant, and a radical polymerization initiator to form an inner polymer layer; and subsequently polymerizing a second monomer mixture in the presence of the surfactant, the radical polymerization initiator, and the inner polymer layer. The first monomer mixture includes an acetoacetoxy-containing monomer such as an acetoacetoxyalkyl acrylate, an acetoacetoxy methacrylate, or a combination of these monomers; an ethylenically unsaturated ester-containing monomer such as an alkyl acrylate, an alkyl methacrylate, or a combination of these monomers; and an ethylenically unsaturated monomer such as a vinyl aromatic monomer, an acrylic acid monomer; a methacrylic acid monomer, or combinations of these monomers. The second monomer mixture includes a monomer such as a vinyl aromatic monomer, an alkyl acrylate, an alkyl methacrylate, or combinations of these monomers.

Additional aspects, features, and advantages of the invention will be apparent upon inspection of the following detailed description of the invention.

DETAILED DESCRIPTION OF THE INVENTION

It has been discovered that the yellowing exhibited by latex formulations upon exposure to heat, aldehydes such as formaldehyde or benzaldehyde, or ultraviolet light may be reduced by producing formulations having certain characteristics. First, it has been discovered that latex formulations in which the outer layer of a polymeric particle comprises incorporated alkyl acrylate monomer, alkyl methacrylate monomer, or a combination of these monomers with little or no styrene exhibits reduced yellowing properties when the latex formulation is exposed to ultraviolet light. Thus, yellowing is reduced when styrene incorporated into the outer layer of a polymeric particle in a latex formulation is replaced with an alkyl methacrylate such as methyl methacrylate. Second, it has been discovered that latex formulations including a polyfunctional amine having at least two amine groups where one of the two amine groups of the polyftinctional amine is bonded to a first carbon atom and a second amine group is bonded to a second carbon atom and 3 or less or 6 or more carbon atoms separate the first carbon atom from the second carbon atom, in place of polyfunctional amines that do not have this characteristic exhibit reduced yellowing upon exposure to thermal radiation. Finally, it has been discovered that inclusion of a reducing agent such as the metabisulfite dianion in latex formulations reduces the yellowing of such formulations that results from exposure to heat and/or aldehydes.

Various types of latex formulations have been found to exhibit reduced yellowing upon exposure to heat, aldehydes and/or light. Some preferred latex formulations include single or double layer polymeric particles while others include multilayer polymeric particles.

In accordance with the above discoveries, the present invention provides latex formulations that exhibit reduced yellowing. Some preferred latex formulations of the present invention include a polymeric particle that exhibits reduced yellowing upon exposure to ultraviolet light. The polymeric particle includes several components. The polymeric particle includes a seed latex polymer, an inner polymer layer, and an outer polymer layer. The seed latex polymer incorporates at least one monomer such as a vinyl aromatic monomer, an alkyl acrylate, an alkyl methacrylate, or combinations of these monomers. The inner polymer layer overlies at least a portion of the seed latex polymer. The inner polymer layer incorporates monomers including: an acetoacetoxy-containing monomer such as an acetoacetoxyalkyl acrylate, an acetoacetoxy methacrylate, or combinations of these monomers; an ethylenically unsaturated ester-containing monomer such as an alkyl acrylate, an alkyl methacrylate, and combinations of these monomers; and an ethylenically unsaturated monomer such as a vinyl aromatic monomer, an acrylic acid monomer, a methacrylic acid monomer, and combinations of these monomers. The inner polymer layer is positioned between at least a portion of the seed latex polymer and the outer polymer layer. The outer layer includes less than about 5 percent by weight of total incorporated vinyl aromatic monomers in addition to including at least one incorporated alkyl acrylate, alkyl methacrylate, or a combination of these monomers.

The present invention also provides a latex formulation that exhibits reduced yellowing upon exposure to heat and/or aldehydes that includes a base, a polyfunctional amine having at least two amine groups, and a polymeric particle. In one embodiment, one of the two amine groups of the polyfunctional amine is bonded to a first carbon atom and a second amine group is bonded to a second carbon atom and 3 or less or 6 or more carbon atoms separate the first carbon atom from the second carbon atom. Surprisingly and unexpectedly, it has been found that the inclusion of such polyfunctional amines in latex formulations reduces the amount of yellowing in the latex formulation. The polymeric particle is the same as that described in the preceding paragraph except that the outer polymer layer may incorporate any amount of a vinyl aromatic monomer in addition to incorporating an alkyl acrylate monomer, an alkyl methacrylate monomer, or a combination of these monomers.

The seed latex polymer of the polymeric particles are generally emulsion polymers such as those incorporating vinyl aromatic monomers, alkyl acrylate monomers, alkyl methacrylate monomers, or combinations of these monomers. The specific composition of the seed latex polymer is not critical to reducing the yellowing of the latex formulation. However, emulsion polymers prepared from styrene, methyl methacrylate, and combinations of these monomers are preferred seed latex polymers for use in the invention.

The inner polymer layer overlies at least a portion of the seed latex polymer. The inner polymer layer generally includes an acetoacetoxy-containing monomer such as an acetoacetoxyalkyl acrylate, an acetoacetoxyalkyl methacrylate, or a combination of these monomers. Examples of such monomers include, but are not limited to, acetoacetoxyethyl acrylate and acetoacetoxyethyl methacrylate. A preferred acetoacetoxyalkyl methacrylate monomer for use in the present invention is acetoacetoxyethyl methacrylate.

The inner polymer layer of the polymeric particle of the latex formulation also includes at least one incorporated ethylenically unsaturated ester-containing monomer such as alkyl acrylates and alkyl methacrylates. Examples of such alkyl acrylates and alkyl methacrylates include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, n-hexyl acrylate, 2-ethylbutyl acrylate, 2-ethylhexyl acrylate, n-octyl acrylate, n-decyl acrylate, cyclopentyl acrylate, cyclohexyl acrylate, benzyl acrylate, phenyl acrylate, cinnamyl acrylate, 2-phenylethyl acrylate, allyl acrylate, methallyl acrylate, propargyl acrylate, crotyl acrylate, 2-hydroxyethyl acrylate, 2-hydroxypropyl acrylate, 2-hydroxybutyl acrylate, 6-hydroxyhexyl acrylate, 5,6-dihydroxyhexyl acrylate, 2-methoxybutyl acrylate, 3-methoxybutyl acrylate, 2-ethoxyethyl acrylate, 2-butoxyethyl acrylate, 2-phenoxyethyl acrylate, glycidyl acrylate, furfuryl acrylate, tetrahydrofurfuryl acrylate, tetrahydropyryl acrylate, N,N-dimethylaminoethyl acrylate, N,N-diethylaminoethyl acrylate, N-butylaminoethyl acrylate, 2-chloroethyl acrylate, 3-chloro-2-hydroxypropyl acrylate, trifluoroethyl acrylate, hexafluoroisopropyl acrylate, 2-nitro-2-methylpropyl acrylate, 2-sulfoethyl acrylate, methyl α-chloroacrylate, methyl α-cyanoacrylate, and the corresponding methacrylates. More preferred monomers of this type for incorporation in the inner polymer layer include methyl methacrylate, 2-ethylhexyl methacrylate and combinations of these monomers.

The inner polymer layer of the polymeric particle of the latex formulation of the present invention also incorporates at least one ethylenically unsaturated monomer such as a vinyl aromatic monomer, an acrylic acid monomer, a methacrylic acid monomer, and combinations of these monomers. The vinyl aromatic monomers for incorporation in the inner polymer layer include those having an aromatic ring bonded to an ethylenic carbon. This group of monomers includes, but is not limited to, styrene, a-methyl styrene, vinyl toluene, p-methylstyrene, t-butylstyrene, o-chlorostyrene, vinyl pyridine, and combinations of these monomers. Preferred vinyl aromatic monomers for incorporation in the inner polymer layer include styrene and α-methylstyrene.

In addition to the three components described above, the inner polymer layer may incorporate other monomers well known in the art. The particular monomers incorporated will depend upon the end use of the polymer being prepared.

The outer polymer layer of the polymeric particles of the latex formulations that exhibit reduced yellowing on exposure to ultraviolet light include at least one incorporated alkyl acrylate monomer, alkyl methacrylate monomer, or combination of these monomers. Preferred outer polymer layers include incorporated 2-ethylhexyl acrylate, methyl methacrylate, methyl acrylate, and combinations of these incorporated monomers. Preferably such an outer polymer layer will have a reduced amount of any incorporated vinyl aromatic monomer, particularly styrene. Thus, in preferred polymeric particles the outer polymer layers will have less than about 5 percent (w/w) of total incorporated vinyl aromatic monomers. More preferred such outer polymer layers will have less than 2 percent (w/w) of total incorporated vinyl aromatic monomers and even more preferred such outer polymer layers will have less than about 1 percent (w/w) of total incorporated vinyl aromatic monomers. Most preferred polymeric particles will have an outer layer that is essentially free of any vinyl aromatic monomer.

Other monomers that may be present in the outer polymer layer of polymeric particles that exhibit reduced yellowing upon exposure to ultraviolet light include, but are not limited to, any acrylate or methacrylate that does not have an aromatic moiety.

The polymeric particles used in the latex formulations of the present invention optionally, but preferably include at least one interstitial polymer layer positioned between the inner and outer polymer layers. Several interstitial layers may be included in the polymeric particles for use in the present invention as will be recognized by those skilled in the art, and the specific monomers included in interstitial polymer layers may be the same as or different from those contained in other interstitial polymer layers. The interstitial polymer layer incorporates monomers including: an acetoacetoxy-containing monomer such as an acetoacetoxy-alkyl acrylate, an acetoacetoxy methacrylate, or combinations of these monomers; an ethylenically unsaturated ester-containing monomer such as an alkyl acrylate, an alkyl methacrylate, or combinations of these monomers; and a diethylenically unsaturated monomer having the formula

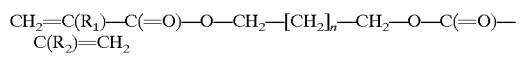

where $R_1$ and $R_2$ are independently either H or an alkyl group having from 1 to 5 carbon atoms and n is an integer ranging from 0 to 12.

The acetoacetoxy-containing monomer incorporated in the interstitial polymer layer or layers has the same characteristics as that incorporated as the inner polymer layer. Thus, preferred acetoacetoxy-containing monomers incorporated into the interstitial polymer layer include acetoacetoxyethyl methacrylate.

The ethylenically unsaturated ester-containing monomer of the interstitial polymer layer or layers has the same characteristics as that incorporated into the inner polymer layer. Thus, preferred such monomers include methyl methacrylate, 2-ethyihexyl methacrylate and combinations of these monomers.

The preferred diethylenically unsaturated monomer incorporated into the interstitial layer or layers having the properties described above include 1,10, decanediol diacrylate, 1,9-nonanediol diacrylate, 1,8-octanediol diacrylate, 1,7-heptanediol diacrylate, 1,6-hexanediol diacrylate, 1,5-pentanediol diacrylate, 1,4-butanediol diacrylate, 1,3-pentanedioldiacrylate, 1,2-ethanediol diacrylate, and combinations of these. An especially preferred diethylenically unsaturated monomer incorporated in the interstitial polymer layer is 1,6-hexanediol diacrylate.

Latex formulations that exhibit reduced yellowing upon exposure to ultraviolet light preferably include a polyfunctional amine having at least two amine groups. Although it is possible to use any polyfunctional amine in such formulations and retain the reduced amount of yellowing due to ultraviolet light exposure, it is preferable to use a polyfunctional amine where one of the two amine groups of the diamine is bonded to a first carbon atom and a second amine group is bonded to a second carbon atom and 3 or less or 6 or more carbon atoms separate the first carbon atom from the second carbon atom. Use of such a polyfunctional amine will reduce the amount of yellowing that occurs when the latex formulation is exposed to heat and/or aldehydes. Preferred polyfunctional amines for use in the present invention include 1,2-diamino-propane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3- diaminohexane, 4-methyl-1,3-diaminohexane, 3-methyl-1,3-diaminohexane, 2-methyl-1,4-diaminohexane, 3-methyl-1,4-diaminohexane, 5methyl-1,4-diaminohexane, 2-methyl-1,5-diaminohexane, 3-methyl-1,5-diaminohexane, 4-methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations of these diamines. An especially preferred polyfunctional amine for inclusion in a latex formulation is 1,3-diaminopentane such as Dytek EP®, a brand of 1,3-diaminopentane available from Rhone-Poulenc (France).

The polyfunctional amine for use in the present invention typically has a molecular weight of less than about 2,000 grams per mole, and preferably has a molecular weight of less than about 1,000 grams per mole.

Preferably, the latex formulations of the present invention also include a base. It has been found that the presence of a base stabilizes latex formulations by preventing gelling from occurring in latex formulations that contain polyfunctional amines and acetoacetoxy groups such as described in U.S. Pat. No. 5,605,953 incorporated herein by reference. Bases which may be used in conjunction with the present invention include amines, ammonia, ammonium hydroxide, and alkali metal hydroxides. Preferred such bases include ammonia, ammonium hydroxide, alkylamines, dialkylamines, and trialkylamines.

Although it is not necessary to do so, a reducing agent is preferably included in any of the latex formulations as this has been found to reduce the amount of yellowing associated with exposure to heat and/or aldehydes. Appropriate such reducing agents include metabisulfite in the form of the dianion or any other salt of metabisulfite, and/or any other sulfite reducing agent well known in the art. This reducing agent may be associated with various cations such as, but not limited to, sodium, lithium, potassium, and tetraalkyl ammonium ions. It is also possible to add mixtures of reducing agents to the latex formulations of the present invention.

Because the addition of a polyfunctional amine where one of the two amine groups is bonded to a first carbon atom and a second amine group is bonded to a second carbon atom and 3 or less or 6 or more carbon atoms separate the first carbon atom from the second carbon atom, and/or the addition of a reducing agent to a latex formulation have been shown to reduce yellowing upon exposure to heat and/or aldehydes, the polymeric particle of a latex formulation containing either or both of these components need not contain an outer polymer layer that includes less than 5 percent by weight of an incorporated vinyl aromatic monomer. Thus, the polymeric particle in such a latex formulation will generally contain a seed latex, an inner polymer layer, and an outer layer that are identical to those of polymeric particles that exhibit reduced yellowing upon exposure to ultraviolet light with the exception that the amount of vinyl aromatic monomer may be increased as described above. Each of the monomers incorporated into the polymeric particles of these formulations has the characteristics previously described with respect to the multilayer polymeric particles.

Although the most preferred latex formulations of the present invention include polymeric particles with the various layers described above, it has been discovered that some latex formulations also exhibit a reduction in yellowing upon exposure to heat and/or light even though no such multilayer structure is present in the polymeric particle. Thus, one preferred latex formulation of the present invention includes a base; water; a polyfunctional amine having at least two amine groups; and a polymeric particle. The polymeric particle comprises a polymer incorporating various monomers including: an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomer, or combinations of these monomers. The total amount of vinyl aromatic monomers is less than about 5 percent, more preferably less than 1 percent, based on the total weight of the polymeric particle. Even more preferred polymeric particles of these latex formulations include a polymer essentially free of any vinyl aromatic monomers. Each of the monomers incorporated into the polymeric particles of these formulations has the characteristics previously described with respect to the multilayer polymeric particles.

Another preferred latex formulation of the present invention includes: a base; water; a polyfunctional amine having at least two amine groups; and a polymeric particle. In such preferred latex formulations one of the two amine groups of the polyfunctional amine is bonded to a first carbon atom and a second amine group is bonded to a second carbon atom and 3 or less or 6 or more carbon atoms separate the first carbon atom from the second carbon atom. The polymeric particle of this preferred latex formulation includes a polymer incorporating monomers comprising: an acetoacetoxy-containing monomer such as an acetoacetoxyalkyl acrylate, an acetoacetoxyalkyl methacrylate, or combinations of these monomers; an ethylenically unsaturated ester-containing monomer such as an alkyl acrylate, an alkyl methacrylate, or combinations of these monomers; and an ethylenically unsaturated monomer such as a vinyl aromatic monomer, an acrylic acid monomer, a methacrylic acid monomer, or combinations of these monomers.

The methods for determining the degree of yellowing are typically both quantitative and qualitative in nature. For determining the degree of yellowing for QUV exposure and heat exposure, a spectrophotometer is generally used. Color changes during aldehyde exposure may be strictly qualitative, as measured by the human eye.

Therefore, a latex of the present invention that demonstrates "reduced yellowing" is said to be qualitatively less yellow if it appears less yellow to the human eye than a similar latex.

Furthermore, a latex of the present invention that demonstrates "reduced yellowing" is said to quantitatively be less yellow than a similar latex, by having its delta E value being at least 50 percent less than the delta E value of a similar latex when measured under identical conditions. In other embodiments, the delta E value of the latex of the present invention is at least 60 percent less, and in still another embodiment, at least 90 percent less, than the delta E value of a similar latex when measured under identical circumstances.

A "similar latex" is identical to a latex of the present invention except for (1) lacking the polyfunctional amine(s) contained within the latex of the present invention, the polyfunctional amine having at least two amine groups, wherein one of the two amine groups of the polyfunctional amine is bonded to a first carbon atom and a second amine group is bonded to a second carbon atom and 3 or less or 6 or more carbon atoms separate the first carbon atom from the second carbon atom in the polyfunctional amine; (2) lacking a reducing agent(s); and/or (3) the outer layer of a polymeric particle of the latex of the present invention comprises incorporated alkyl acrylate monomer, alkyl methacrylate monomer, or a combination of these monomers substituted for part or all of the styrene monomers in a similar latex.

Generally, polymeric particles of the present invention were prepared using emulsion polymerization techniques known to those skilled in the art. For example, a lower temperature initiator such as, but not limited to, ammonium persulfate was typically added as an aqueous solution to an agitated reaction mixture comprising water; a nonionic or anionic surfactant such as Rhodapon®, a brand of sodium lauryl sulfate available from Rhone-Poulenc (Paris, France); and a seed latex polymer with the characteristics described above. The initiator was generally added and the temperature maintained at a temperature ranging from about 70° C. to 90° C. (more preferably from about 75° C. to about 85° C. or most preferably at a temperature of about 80° C. After the addition, the reaction mixture was typically stirred for a period of about five minutes although those skilled in the art will recognize that the reaction can be stirred for time periods of from about 5 minutes to about 20 minutes generally at about 65° C. to about 95° C. before the inner polymer layer monomeric components are added to the mixture.

Next, the monomeric components making up the inner polymer layer as described above were typically added to the reaction mixture at a rate ranging from about 2 to about 7 grams/minute, more preferably from about 3 to about 5 grams/minute, and most preferably at a rate ranging from about 3.6 to about 4.2 grams/minute. The temperature was generally maintained from about 70°C. to 90° C. (more preferably from about 75° C. to about 85° C.), but was most preferably maintained at about 80° C. Following addition of the inner layer components, a base such as, but not limited to, ammonium hydroxide was added to the reaction mixture usually over a period ranging from about 3 to 8 minutes, more preferably over a period ranging from about 4 to 6 minutes, and most preferably over a period of about 5 minutes. Following addition of the base, the reaction was typically agitated while maintaining the temperature at about 80° C. for a period ranging from about 8 to about 30 minutes, more preferably for a period ranging from about 10 to about 20 minutes, and most preferably for 15 minutes.

Following addition of the inner polymer layer monomeric components and the base, the monomeric component(s) comprising the outer polymer layer were typically added to the agitated reaction mixture at a rate of from 1 to 5 grams/minute, more preferably at a rate of from 2 to 4 grams/minute, and most preferably at a rate of about 3.3 grams/minutes. The temperature was maintained at a temperature ranging from about 70° C. to 90° C. (more preferably from about 75° C. to about 85° C.), but was most preferably maintained at about 80° C. during the addition. Following the addition, a base, such as, but not limited to, ammonium hydroxide was added to the reaction mixture over a period of about 15 minutes, and the reaction was then typically agitated for a period of about 1 hour while maintaining the same temperature as that used during the addition. The reaction mixture was then cooled to about 40° C. and an aqueous solution of the diamine was added to the mixture. The resulting solution was then typically filtered into a storage vessel.

Components suitable for use in one or more interstitial layers were optionally added before addition of the outer polymer layer monomeric components. Generally, if one or more interstitial layers was desired, the interstitial layer monomeric components were added to the agitated reaction mixture at a rate ranging from about 4 to about 10 grams/ minute, more preferably at a rate of from about 5 to about 8 grams/minute, and most preferably at a rate of about 6.8 grams/minute. Generally the reaction mixture was agitated at a temperature ranging from about 70° C. to 90° C. (more preferably from about 75° C. to about 85° C.), but was most preferably maintained at about 80° C. for a period of about 15 minutes before the components of another optional interstitial layer or the outer polymer layer were added to the reaction mixture.

The preparation of single layer polymeric particles for inclusion in latex formulations of the present invention are prepared in a manner similar to the preparation of the multilayer particles described above. However, in the preparation of single layer polymeric particles, each of the monomers is added at the same time in a single stage to produce the polymeric particles.

The invention is further described in the following, non-limiting examples.

EXAMPLES

The following abbreviations are used in the Examples:
AA: Acrylic acid
AAEM: Acetoacetoxyethyl methacrylate
APS: Ammonium persulfate
BA: Butyl alcohol
Dytek® A: Dytek® A is a brand of 2-methyl-1,5-diaminopentane available from E. I. duPont de Nemours (Wilmington, Del.)
Dytek® EP: Dytek® EP is a brand of 1,3-diaminopentane available from E. I. duPont de Nemours (Wilmington, Del.)
2-EHA: 2-Ethylhexyl acrylate
1,6-HDDA: 1,6-Hexanediol diacrylate
IBMA: Isobutyl methacrylate
MA: Methyl acrylate
MAA: Methacrylic acid
MMA: Methyl methacrylate
St: Styrene All percentages used in the Examples herein are by weight, unless otherwise indicated. Generally, each of the emulsion polymerizations described below were performed under a nitrogen atmosphere.

Example 1

All Acrylic Latex with Polystyrene Seed

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS (15 g of a 33% (w/w) aqueous solution), a brand of sodium lauryl sulfate surfactant available from Rhone-Poulenc (France), at 80° C. was added an aqueous solution of APS initiator (3.0 g in 15 mL of water). After waiting five minutes, a mixture of 2-EHA (59.8 g), MMA (150 g), MAA (13 g), and AAEM (25.7 g) was added to the agitated reaction mixture at a rate of approximately 3.8 g per minute. After addition was complete, an aqueous ammonium hydroxide solution (1.03 g ammonium hydroxide in 33 mL water) was added to the agitated reaction mixture over a period of five minutes. The reaction mixture was then stirred for 15 minutes at 80° C. before a mixture of MMA (36.3 g), 2-EHA (155.2 g), 1,6-HDDA (11.06 g), and AAEM (7.53 g) was added to the agitated reaction mixture at a rate of approximately 6.8 grams per minute. After addition was complete, the reaction mixture was agitated for 15 minutes before adding MMA (164.3 g) at a rate of approximately 3.3 grams per minute. After the MMA addition was complete, an aqueous ammonium hydroxide solution (10.6 grams of ammonium hydroxide in 33 ml water) and water (36 mL)

were added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1,5-pentanediamine in water). The resulting latex was then filtered into a storage vessel.

Example 2
All Acrylic Latex with MMA Seed

To an agitated 2 liter reaction flask equipped with a mechanical stirrer, reflux condenser, thermometer, and inlet port and containing water (870 mL), seed latex (68 g of a 33% (w/w) MMA emulsion), and Rhodapon® SLS brand surfactant (15 g of a 33% (w/w) aqueous solution) at 80° C. was added an aqueous solution of APS initiator (3.0 g in 15 mL of water). After waiting five minutes, a mixture of 2-EHA (59.8 g), MMA (150 g), MAA (13 g), and AAEM (25.7 g) was added to the agitated reaction mixture at a rate of approximately 3.8 g per minute. After addition was complete, an aqueous ammonium hydroxide solution (1.03 g ammonium hydroxide in 33 mL water) was added to the agitated reaction mixture over a period of five minutes. The reaction mixture was then stirred for 15 minutes at 80° C. before a mixture of MMA (36.3 g), 2-EHA (155.2 g), 1,6-HDDA (11.0 g), and AAEM (7.53 g) was added to the agitated reaction mixture at a rate of approximately 6.8 grams per minute. After addition was complete, the reaction mixture was agitated for 15 minutes before adding MMA (164.3 g) at a rate of approximately 3.3 grams per minute. After the MMA addition was complete, an aqueous ammonium hydroxide solution (10.6 grams of ammonium hydroxide in 33 ml water) and water (36 mL) were added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1,5-pentanediamine in water). The resulting latex was then filtered into a storage vessel.

Example 3
Latex with Polystyrene Seed and MMA Outer Layer

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS brand surfactant (15 g of a 33% (w/w) aqueous solution at 80° C. was added an aqueous solution of APS initiator (3.0 g in 15 mL of water). After waiting five minutes, a mixture of St (24.6 g), 2-EHA (59.8 g), MMA (125.5 g), MAA (13 g), and AAEM (25.7 g) was added to the agitated reaction mixture at a rate of approximately 3.8 g per minute. After addition was complete, an aqueous ammonium hydroxide solution (1.03 g ammonium hydroxide in 33 ML water) was added to the agitated reaction mixture over a period of five minutes. The reaction mixture was then stirred for 15 minutes at 80° C. before a mixture of St (36.3 g), 2-EHA (155.2 g), 1,6-HDDA (11.0 g), and AAEM (7.53 g) was added to the agitated reaction mixture at a rate of approximately 6.8 grams per minute. After addition was complete, the reaction mixture was agitated for 15 minutes before adding MMA (164.3 g) at a rate of approximately 3.3 grams per minute. After the MMA addition was complete, an aqueous ammonium hydroxide solution (10.5 grams of ammonium hydroxide in 33 ml water) and water (36 mL) were added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1,5-pentanediamine in water). The resulting latex was then filtered into a storage vessel.

Example 4
Latex with St in Inner Layers and MMA in Outer Layer

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS brand surfactant (15 g of a 33% (w/w) aqueous solution) at 80° C. was added an aqueous solution of APS initiator (3.0 g in 15 mL of water). After waiting five minutes, a mixture of St (150 g), 2-EHA (59.8 g), MAA (13 g), and AAEM (25.7 g) was added to the agitated reaction mixture at a rate of approximately 3.8 g per minute. After addition was complete, an aqueous ammonium hydroxide solution (1.03 g ammonium hydroxide in 33 mL water) was added to the agitated reaction mixture over a period of five minutes. The reaction mixture was then stirred for 15 minutes at 80° C. before a mixture of St (36.6 g), 2-EHA (155.2 g), 1,6-HDDA (11.0 g), and AAEM (7.53 g) was added to the agitated reaction mixture at a rate of approximately 6.8 grams per minute. After addition was complete, the reaction mixture was agitated for 15 minutes before adding MMA (164.3 g) at a rate of approximately 3.3 grams per minute. After the MMA addition was complete, an aqueous ammonium hydroxide solution (10.5 grams of ammonium hydroxide in 33 ml water) and water (36 mL) were added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1, 5-pentanediamine in water). The resulting latex was then filtered into a storage vessel.

Example 5
Latex with 50:50 (weight ratio) 2-EHA to MMA in Outer Layer

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS (22.3 g of a 33% (w/w) aqueous solution), a brand of sodium lauryl sulfate surfactant available from Rhone-Poulenc (France) at 80° C. was added an aqueous solution of APS initiator (3.0 g in 15 mL of water). After waiting five minutes, a mixture of St (22.78 g), 2-EHA (57.3 g), MMA (119.02 g), MAA (15.7 g), and AAEM (25.7 g) was added to the agitated reaction mixture at a rate of approximately 3.8 g per minute. After addition was complete, an aqueous ammonium hydroxide solution (1.06 g ammonium hydroxide in 33 mnL water) was added to the agitated reaction mixture over a period of five minutes. The reaction mixture was then stirred for 15 minutes at 80° C. before a mixture of St (38.9 g), 2-EHA (148.7 g), 1,6-HDDA (11.0 g), and AAEM (7.0 g) was added to the agitated reaction mixture at a rate of approximately 6.8 grams per minute. After addition was complete, the reaction mixture was agitated for 15 minutes before adding a mixture of MMA (75.0 g) and 2-EHA (75.0 g)at a rate of approximately 3.3 grams per minute. After the 2-EHA/MMA addition was complete, an aqueous ammonium hydroxide solution (10.7 grams of ammonium hydroxide in 33 ml water) and water (36 mL) were added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1,5-pentanediamine in water). The resulting latex was then filtered into a storage vessel.

Example 6
Latex with 15:135 (weight ratio) 2-EHA to MMA in Outer Layer

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS brand surfactant (22.3 g of a 33% (w/w) aqueous solution) at 80° C. was added an aqueous solution of APS initiator (3.0 g in 15 mnL of water). After waiting five minutes, a mixture of St (22.78 g), 2-EHA (57.3 g), MMA (119.02 g), MAA (15.7 g), and AAEM (25.7 g) was added to the agitated reaction mixture at a rate of approximately 3.8 g per minute. After addition was complete, an aqueous ammonium hydroxide solution (1.06 g ammonium hydroxide in 33 mL water) was added to the agitated reaction mixture over a period of five minutes. The reaction mixture was then stirred for 15 minutes at 80° C. before a mixture of St (38.9 g), 2-EHA (148.7 g), 1,6-HDDA (11.0 g), and AAEM (7.5 g) was added to the agitated reaction mixture at a rate of approximately 6.8 grams per minute. After addition was complete, the reaction mixture was agitated for 15 minutes before adding a mixture of 2-EHA (15 g) and MMA (135 g) at a rate of approximately 3.3 grams per minute. After the 2-EHA/MMA addition was complete, an aqueous ammonium hydroxide solution (10.6 grams of ammonium hydroxide in 33 ml water) and water (36 mL) were added to the reaction mixture over a period of 15 minutes and the reaction was agitated for one hour at 80° C. The resulting latex was then cooled to 40° C. before adding an aqueous solution of DytekO A (34.7 g of a 30% (w/w) solution of 2-methyl-1, 5-pentanediamine in water). The resulting latex was then filtered into a storage vessel.

Example 7
Latex with 162:2 (weight ratio) of 2-EHA to 1.6-HDDA in Outer Layer To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS brand surfactant (22.3 g of a 33% (w/w) aqueous solution) at 80° C. was added an aqueous solution of APS initiator (3.0 g in 15 mL of water). After waiting five minutes, a mixture of St (22.8 g), 2-EHA (57.3 g), MMA (119.02 g), MAA (15.7 g), and AAEM (25.7 g) was added to the agitated reaction mixture at a rate of approximately 3.8 g per minute. After addition was complete, an aqueous ammonium hydroxide solution (1.06 g ammonium hydroxide in 33 mL water) was added to the agitated reaction mixture over a period of five minutes. The reaction mixture was then stirred for 15 minutes at 80° C. before a mixture of St (38.5 g), 2-EHA (148.7 g), 1,6-HDDA (9.0 g), and AAEM (7.5 g) was added to the agitated reaction mixture at a rate of approximately 6.8 grams per minute. After addition was complete, the reaction mixture was agitated for 15 minutes before adding a mixture of 1,6-HDDA (2.0 g) and 2-EHA (162 g) at a rate of approximately 3.3 grams per minute. After the 1,6-HDDA/2-EHA addition was complete, an aqueous ammonium hydroxide solution (10.7 grams of ammonium hydroxide in 33 ml water) was added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1,5-pentanediamine in water). The resulting latex was then filtered into a storage vessel.

Example 8
Latex with 160:4 (weight ratio) 2-EHA to 1.6-HDDA in Outer Layer

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS brand surfactant (22.3 g of a 33% (w/w) aqueous solution) at 80° C. was added an aqueous solution of APS initiator (3.0 g in 15 mL of water). After waiting five minutes, a mixture of St (22.8 g), 2-EHA (57.3 g), MMA (119.02 g), MAA (15.7 g), and AAEM (25.7 g) was added to the agitated reaction mixture at a rate of approximately 3.8 g per minute. After addition was complete, an aqueous ammonium hydroxide solution (1.06 g ammonium hydroxide in 33 mL water) was added to the agitated reaction mixture over a period of five minutes. The reaction mixture was then stirred for 15 minutes at 80° C. before a mixture of St (38.5 g), 2-EHA (148.7 g), 1,6-HDDA (7.0 g), and AAEM (7.5 g) was added to the agitated reaction mixture at a rate of approximately 6.8 grams per minute. After addition was complete, the reaction mixture was agitated for 15 minutes before adding a mixture of 1,6-HDDA (4.0 g) and 2-EHA (160 g) at a rate of approximately 3.3 grams per minute. After the 1,6-HDDA/2-EHA addition was complete, an aqueous ammonium hydroxide solution (10.7 grams of ammonium hydroxide in 33 ml water) was added to the reaction mixture over a period of 15 minutes and the reaction was agitated for one hour at 80° C. The resulting latex was then cooled to 40° C. before adding an aqueous solution of Dytek® A (34.7 g of a 30% (w/w) solution of 2-methyl-1,5-pentanediamine in water). The resulting latex was then filtered into a storage vessel.

Example 9
Latex with 8.2:155.8 (weight ratio) of 2-EHA to MMA in Outer Layer To an agitated 2 liter reaction flask equipped with a mechanical stirrer, reflux condenser, thermometer, and inlet port and containing water (870 mL), seed latex (68 g of a 33% (w/w) polystyrene emulsion), and RhodaponO SLS brand surfactant (22.3 g of a 33% (w/w) aqueous solution) at 80° C. was added an aqueous solution of APS initiator (3.0 g in 15 mL of water). After waiting five minutes, a mixture of St (22.8 g), 2-EHA (57.3 g), MMA (119.02 g), MAA (15.7 g), and AAEM (25.7 g) was added to the agitated reaction mixture at a rate of approximately 3.8 g per minute. After addition was complete, an aqueous ammonium hydroxide solution (1.25 g ammonium hydroxide in 33 mL water) was added to the agitated reaction mixture over a period of five minutes. The reaction mixture was then stirred for 15 minutes at 80° C. before a mixture of St (38.9 g), 2-EHA (148.7 g), 1,6-HDDA (11 g), and AAEM (7.5 g) was added to the agitated reaction mixture at a rate of approximately 6.8 grams per minute. After addition was complete, the reaction mixture was agitated for 15 minutes before adding a mixture of 2-EHA (8.2 g) and MMA (155.8 g) at a rate of approximately 3.3 grams per minute. After the 2-EHA/MMA addition was complete, an aqueous ammonium hydroxide solution (12 grams of ammonium hydroxide in 33 ml water) was added to the reaction mixture over a period of 15 minutes and the reaction was agitated for one hour at 80° C. The resulting latex was then cooled to 40° C. before adding an aqueous solution of Dytek® A (34.7 g of a 30% (wlw) solution of 2-methyl-1,5-pentanediamine in water). The resulting latex was then filtered into a storage vessel.

Example 10
Latex with 50:50 (weight ratio) of MAA to MA in Outer Layer

To an agitated 2 liter reaction flask equipped with a mechanical stirrer, reflux condenser, thermometer, and inlet port and containing water (870 mL), seed latex (68 g of a 33% (w/w) polystyrene emulsion), and Rhodapon® SLS brand surfactant (22.3 g of a 33% (w/w) aqueous solution) at 80° C. was added an aqueous solution of APS initiator (3.0 g in 15 mL of water). After waiting five minutes, a mixture of St (22.8 g), 2-EHA (57.3 g), MMA (119.02 g), MAA (15.7 g), and AAEM (25.7 g) was added to the agitated reaction mixture at a rate of approximately 3.8 g per minute. After addition was complete, an aqueous ammonium hydroxide solution (1.06 g ammonium hydroxide in 33 mL water) was added to the agitated reaction mixture over a period of five minutes. The reaction mixture was then stirred for 15 minutes at 80° C. before a mixture of St (38.9 g), 2-EHA (148.7 g), 1,6-HDDA (11 g), and AAEM (7.5 g) was added to the agitated reaction mixture at a rate of approximately 6.8 grams per minute. After addition was complete, the reaction mixture was agitated for 15 minutes before adding a mixture of MA (82 g) and MMA (82 g) at a rate of approximately 3.3 grams per minute. After the MA/MMA addition was complete, an aqueous ammonium hydroxide solution (10.7 grams of ammonium hydroxide in 33 ml water) was added to the reaction mixture over a period of 15 minutes and the reaction was agitated for one hour at 80° C. The resulting latex was then cooled to 40° C. before adding an aqueous solution of DytekO A (34.7 g of a 30% (w/w) solution of 2-methyl-1,5-pentanediamine in water). The resulting latex was then filtered into a storage vessel.

Example 11

Example 2 Latex with Reducing Agent

The procedure of Example 2 was followed with the following changes: first, 800 mL rather than 870 niL of water was initially present in the reaction vessel; and second a solution of 7.0 g of sodium metabisulfite in 70 mL water was added to the reaction along with the final addition of ammonium hydroxide.

Example 12
Example 3 Latex with Reducing Agent

The procedure of Example 3 was followed with the following changes: first, 800 mL rather than 870 mL of water was initially present in the reaction vessel; second, no diamine was added; and third, a solution of 7.0 g of sodium metabisulfite in 70 mL water was added to the reaction along with the fmal addition of ammonium hydroxide.

Example 13
Example 2 Latex with 25% Reduction in $NH_4OH$

The procedure of Example 2 was repeated except that the amount of ammonium hydroxide used was reduced by 25%.

Example 14
Example 2 Latex with 50% Reduction in $NH_4OH$

The procedure of Example 2 was repeated except that the amount of ammonium hydroxide used was reduced by 50%.

Example 15
Example 3 Latex with 25% Reduction in $NH_4OH$

The procedure of Example 3 was repeated except that the amount of ammonium hydroxide used was reduced by 25%.

Example 16
Example 3 Latex with 50% Reduction in $NH_4OH$

The procedure of Example 3 was repeated except that the amount of ammonium hydroxide used was reduced by 50%.

Example 17
Example 4 Latex with 25% Reduction in $NH_4OH$

The procedure of Example 4 was repeated except that the amount of ammonium hydroxide used was reduced by 25%.

Example 18
Example 4 Latex with 50% Reduction in $NH_4OH$

The procedure of Example 4 was repeated except that the amount of ammonium hydroxide used was reduced by 50%.

Example 19
Example 4 Latex with 20% Reduction in APS

The procedure of Example 4 was repeated except that the amount of APS initiator used was reduced by 20%.

Example 20
Example 6 Latex with 20% Reduction in APS

The procedure of Example 6 was repeated except that the amount of APS initiator used was reduced by 20%.

Example 21
Example 7 Latex with 20% Reduction in APS

The procedure of Example 7 was repeated except that the amount of APS initiator used was reduced by 20%.

Example 22
Example 9 Latex with 20% Reduction in APS

The procedure of Example 9 was repeated except that the amount of APS initiator used was reduced by 20%.

Example 23

To an agitated 5 liter reaction flask containing water (1.6 L), a crosslinked polystyrene (98%) seed latex (130.4 g), and Rhodapon® LCP (44.6 g) (sodium lauryl sulfate (33%) in $H_2O$), a brand of surfactant available from RhonePoulenc (France), at 80° C. was added an aqueous solution of APS initiator (4.0 g in 40 mL of water). After waiting five minutes, a mixture of St (45.56 g), 2-EHA (114.58 g), MMA (238.04 g), MAA (21.40 g), and AAEM (50.0 g) was added to the agitated reaction mixture at a rate of approximately 6.8 g per minute. After addition was complete, an aqueous ammonium hydroxide solution (2.12 g ammonium hydroxide in 66 mL water) was added to the agitated reaction mixture over a period of ten minutes. Next, a mixture of St (77.72 g), 2-EHA (297.4 g), 1,6-HDDA (21.2 g), and AAEM (15.0 g) was added to the agitated reaction mixture at a rate of approximately 10 grams per minute. After addition was complete, the reaction mixture was agitated for 15 minutes before adding St (215 g) at a rate of approximately 7.0 grams per minute. After the St addition was complete, an aqueous ammonium hydroxide solution (21.46 grams of ammonium hydroxide in 66 ml water) was added to the reaction mixture and the reaction was agitated for one hour. The resulting latex was then cooled to 40° C. and filtered, into a storage vessel. Finally, the quantity of non-volatiles in latex was calculated to be 39 percent.

Example 24
Determination of Degree of Yellowing of Sample Latexes

The methods for determining the degree of yellowing were both quantitative and qualitative in nature. For determining the degree of yellowing for QUV exposure and heat exposure a MacBeth Color Eye 7000 spectrophotometer was used (model CE 7000). Color changes during aldehyde exposure were strictly qualitative (via the human eye). A first series of tests consisted of dropping liquid formaldehyde into the following latexes and watching the color development over 2 or 3 days. A second series of tests involved placing the unsealed portion of a Lenetta card over the latex films (benzaldehyde is released by the card) and watching the color development over a period of weeks.

A. QUV Yellowing

Latex samples were prepared wherein one of the samples replaced styrene with MMA. A first sample was prepared according to Example 3, and a second sample was prepared in an identical fashion, with the styrene being replaced by an equal amount of MMA. The delta E value for the first sample containing styrene was 2.759 after 300 hours exposure to UV light. The delta E value for the second non-styrene containing sample was 1.06 after 300 hours. This represents a 61.5 percent improvement in yellowing during QUV exposure.

The improvement in QUV was even greater with extended time frames. A first latex sample was prepared as follows. A flask was charged with $H_2O$ (930 g) and sodium lauryl sulfate (12.6 g) and heated to 80° C. Ammonium persulfate (2.8 g in 36 g $H_2O$) was added and the solution allowed to stand for 5 minutes. Phase1 was prepared by mixing together the following: MA (20 g), AA (4 g), MMA (55 g), 2-EHA (50 g), BA (22 g), AAEM (66.2 g), and isooctyl mercaptoproprionate (4.4 g). Phase 1 was added to the flask over a period of 50 min. This mixture was held for 15 min., and an Interphase added over a 5 min. period. The Interphase comprised $H_2O$ (24 g) and ammonia (28%) (2 g). Phase 2 was prepared as follows and added to the mixture over a 40 min. period: MMA (48 g), BA (105 g), 2-EHA (107 g), AAEM (13.8 g), and 1,6-HDDA (2 g). The mixture was held for 15 minutes, and a second Interphase was added over a 5 minute period. The second Interphase comprised $H_2O$ (24 g) and ammonia (28%) (2.5 g). Phase 3 was added to the mixture over a 50 min. period. Phase 3 comprised MMA (220 g), 2-EHA (90 g). The mixture was held for 1 hr., and a mixture of $H_2O$ (31.8 g), ammonia (15.06 g) followed by flush $H_2O$ (67.6 g) added over a 15 min. period.

The first sample had a delta E value of 1.815 after 1300 hours while the second sample which was identical to that prepared in Example 23 (styrene based), differing only in having 45% solids, which had a delta E value of 18.302. This represents a 90% improvement in yellowing. This is because the styrene containing samples continue to yellow at a relatively linear rate whereas the nonstyrene containing materials yellow initially and then plateau. Thus, a decrease in the amount of styrene in the outer layer of the latex decreased the amount of yellowing which occurred as a result of exposure to ultraviolet radiation. The use of a diamine such as Dytek EP instead of Dytek A and the presence of a reducing agent were not found to significantly impact the amount of yellowing solely due to exposure to ultraviolet radiation.

B. Heat Induced Yellowing

An MMA based latex sample was made according to Example 12. Example 12 used sodium metabisulfite and had no diamine added to it. Dytek A was added to a portion of the latex sample which gave a delta E value of 4.451 after 24 hours in an oven at 100° C. The remainder of the latex was prepared under identical conditions except that Dytek EP was added to it in place of the Dytek A. The Dytek EP-containing sample gave a delta E value of 2.452 after 24 hours in an oven at 100° C. Thus, the sample containing the Dytek EP exhibited significantly less yellowing than an identical sample prepared with Dytek A. Generally, the difference in color between Dytek A and Dytek EP containing samples was about 50%.

C. Aldehyde Exposure Yellowing

A sample was prepared using the procedure of Examples 3 except that Dytek EP was used rather than Dytek A. Another sample was prepared using the procedure of Example 12 except that it contained Dytek EP in place of the Dytek A described in Example 3. Thus, the only significant difference between the two samples was that one of them contained sodium metabisulfite while the other did not. When formaldehyde was added to the sample containing the sodium metabisulfite, very little color change was seen within one week. On the other hand, the sample that did not contain sodium metabisulfite showed a great deal of yellowing within 1 to 2 days when formaldehyde was added.

Example 25

Single Stage Non-Yellowing Latex

A single stage latex control sample was prepared as follows. To an agitated 2 liter reaction flask equipped with a mechanical stirrer, reflux condenser, thermometer and inlet port, was added deionized water (402 mL); Brij™ 30 (2.27 g), a nonionic polyoxyethylene(4) lauryl ether surfactant produced by ICI Americas and available from Aldrich Chemical (Milwaukee, Wis.); Brij™ 35 (5.83 g), a nonionic polyoxyethylene(23) lauryl ether surfactant produced by ICI Americas and available from Aldrich Chemical (Milwaukee, Wis.); and Stepanol™ WA-100 (7.5 g of a 30% (w/w) solution) brand lauryl sulfate produced by Stepan Chemical Company and available from Emco Chemical Distributors (Chicago, Ill.). The temperature of the mixture was brought to 80° C. and the reaction was maintained under a nitrogen atmosphere and stirred at between 160–180 rpm. After the temperature had stabilized at 80° C., a solution of APS (4.5 g dissolved in deionized water to form a 10% solution) was added to the mixture, and the mixture was stirred for 10 minutes. Next, a mixture of monomers was added over a period of 2 hours while maintaining the temperature at 80° C. and stirring between 160 and 180 rpm. The monomer mixture included: AAEM (12.95 g); MAA (21.58 g); St (103.59 g); MMA (43.16 g); 2-EHA (107.91 g); and IBMA (142.22 g). The reaction was stirred for an additional hour after the 2 hour monomer addition was complete and then cooled to room temperature and filtered. The resulting emulsion was then neutralized by adding a 28% aqueous solution of ammonium hydroxide (15.22 g). Finally, a 35% aqueous solution of Dytek A (10.04 g) was added to the filtered and neutralized emulsion.

This sample contained Dytek A and gave a delta E value of 4 after exposure to a temperature of 100° C. for 24 hours. A second single stage latex sample was prepared that was identical to the control sample except that it was prepared using Dytek EP rather than Dytek A. The Dytek EP sample generally gave delta E values of 1.731 after exposure to a temperature of 100° C. for 24 hours. Thus, the amount of yellowing that occurred upon exposure to heat was reduced by greater than 50 percent when Dytek EP was used rather than Dytek A.

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. A latex formulation that exhibits reduced yellowing, comprising a polymeric particle, the polymeric particle comprising:
   (a) a seed latex polymer incorporating at least one monomer selected from the group consisting of vinyl aromatic monomers, alkyl acrylates, alkyl methacrylates, and combinations thereof;
   (b) an inner polymer layer overlying at least a portion of the seed latex polymer, the inner polymer layer incorporating monomers comprising:
      (i) an acetoacetoxy-containing monomer selected from the group consisting of acetoacetoxyalkyl acrylates, acetoacetoxyalkyl methacrylates, and combinations thereof;
      (ii) an ethylenically unsaturated estercontaining monomer selected from the group consisting of alkyl acrylates, alkyl methacrylates and combinations thereof; and
      (iii) an ethylenically unsaturated monomer selected from the group of monomers consisting of vinyl aromatic monomers, acrylic acid monomers, methacrylic acid monomers, and combinations thereof; and
   (c) an outer polymer layer comprising less than about 5 percent by weight of total incorporated vinyl aromatic monomers and comprising at least one incorporated monomer selected from the group consisting of alkyl acrylates, alkyl methacrylates, and combinations thereof, wherein the inner polymer layer is positioned between at least a portion of the seed latex polymer and the outer polymer layer and the polymeric particle exhibits reduced yellowing upon exposure to ultraviolet light.

2. The latex formulation that exhibits reduced yellowing according to claim 1, wherein the monomer incorporated in the outer polymer layer comprises a monomer selected from the group consisting of methyl methacrylate, 2-ethylhexyl acrylate, and combinations thereof.

3. The latex formulation that exhibits reduced yellowing according to claim 1, wherein the polymeric particle further comprises at least one interstitial polymer layer positioned between the inner polymer layer and the outer polymer layer, the interstitial polymer layer incorporating monomers comprising:
   (a) an acetoacetoxy-containing monomer selected from the group consisting of acetoacetoxyalkyl acrylates, acetoacetoxyalkyl methacrylates, and combinations thereof;
   (b) an ethylenically unsaturated ester-containing monomer selected from the group consisting of alkyl acrylates, alkyl methacrylates and combinations thereof; and
   (c) a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12.

4. The latex formulation that exhibits reduced yellowing according to claim 1 or 3, wherein the latex formulation further comprises a polyfunctional amine having at least two amine groups.

5. The latex formulation that exhibits reduced yellowing according to claim 4, wherein one of the two amine groups of the polyfunctional amine is bonded to a first carbon atom and a second amine group is bonded to a second carbon atom and 3 or less or 6 or more carbon atoms separate the first carbon atom from the second carbon atom in the polyfunctional amine.

6. The latex formulation that exhibits reduced yellowing according to claim 4, wherein the latex formulation further comprises a base.

7. The latex formulation that exhibits reduced yellowing according to claim 6, wherein the base is selected from the group consisting of ammonia, ammonium hydroxide, alkylamines, dialkylamines, trialkylamines, and combinations thereof.

8. The latex formulation according to claim 4, wherein the latex formulation further comprises a reducing agent.

9. The latex formulation that exhibits reduced yellowing according to claim 8, wherein the reducing agent is metabisulfite dianion.

10. The latex formulation that exhibits reduced yellowing according to claim 5, wherein the polyfunctional amine is selected from the group consisting of 1,2-diaminopropane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3-diaminohexane, 4-methyl-1,3-diaminohexane, 3-methyl-1,3-diaminohexane, 2-methyl-1,4-diaminohexane, 3-methyl-1,4-diaminohexane, 5-methyl-1,4-diaminohexane, 2-methyl-1,5-diaminohexane, 3-methyl-1,5-diaminohexane, 4-methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations thereof.

11. The latex formulation that exhibits reduced yellowing according to claim 10, wherein the polyfunctional amine is 1,3-diaminopentane.

12. The latex formulation that exhibits reduced yellowing according to claim 1, wherein the acetoacetoxy-containing monomer is acetoacetoxyethyl methacrylate, the ethylenically unsaturated ester-containing monomer is 2-ethylhexyl acrylate, and the at least one incorporated monomer of the outer polymer layer is selected from the group consisting of methyl methacrylate, 2-ethylhexyl acrylate, methyl acrylate, and combinations thereof.

13. The latex formulation that exhibits reduced yellowing according to claim 3, wherein the diethylenically unsaturated monomer of the interstitial polymer layer is selected from the group consisting of 1,10, decanediol diacrylate, 1,9-nonanediol diacrylate, 1,8-octanediol diacrylate, 1,7-heptanediol diacrylate, 1,6-hexanediol diacrylate, 1,5-pentanediol diacrylate, 1,4-butanediol diacrylate, 1,3-pentanedioldiacrylate, 1,2-ethanediol diacrylate, and combinations thereof.

14. The latex formulation that exhibits reduced yellowing according to claim 13, wherein the diethylenically unsaturated monomer of the interstitial polymer layer is 1,6-hexanediol diacrylate.

15. The latex formulation that exhibits reduced yellowing according to claim 14, wherein the acetoacetoxy-containing monomer of the interstitial polymer layer is acetoacetoxyethyl methacrylate.

16. The latex formulation that exhibits reduced yellowing according to claim 1 wherein the outer polymer layer comprises less than about 1 percent by weight of total incorporated vinyl aromatic monomers.

17. A latex formulation that exhibits reduced yellowing, comprising a base, a polyfunctional amine having at least two amine groups, wherein one of the two amine groups of the polyfunctional amine is bonded to a first carbon atom and a second amine group is bonded to a second carbon atom and 3 or less or 6 or more carbon atoms separate the first carbon atom from the second carbon atom in the polyfunctional amine; and a polymeric particle, the polymeric particle comprising:

(a) a seed latex polymer incorporating a monomer selected from the group consisting of vinyl aromatic monomers, alkyl acrylates, alkyl methacrylates, and combinations thereof;

(b) an inner polymer layer overlying at least a portion of the seed latex polymer, the inner polymer layer incorporating monomers comprising:

(i) an acetoacetoxy-containing monomer selected from the group consisting of acetoacetoxyalkyl acrylates, acetoacetoxyalkyl methacrylates, and combinations thereof;

(ii) an ethylenically unsaturated ester-containing monomer selected from the group consisting of alkyl acrylates, alkyl methacrylates and combinations thereof; and (iii) an ethylenically unsaturated monomer selected from the group of monomers consisting of vinyl aromatic monomers, acrylic acid monomers, methacrylic acid monomers, and combinations thereof; and (c) an outer polymer layer comprising at least one incorporated monomer selected from the group consisting of alkyl acrylates, alkyl methacrylates, and combinations thereof, wherein the inner polymer layer is positioned between at least a portion of the seed latex polymer and the outer polymer layer and the latex formulation exhibits reduced yellowing when exposed to heat or aldehydes.

18. The latex formulation that exhibits reduced yellowing according to claim 17, wherein the polymeric particle further comprises at least one interstitial polymer layer positioned between the inner polymer layer and the outer polymer layer, the interstitial polymer layer incorporating monomers comprising:

(a) an acetoacetoxy-containing monomer selected from the group consisting of acetoacetoxyalkyl acrylates, acetoacetoxyalkyl methacrylates, and combinations thereof;

(b) an ethylenically unsaturated ester-containing monomer selected from the group consisting of alkyl acrylates, alkyl methacrylates and combinations thereof; and (c) a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12.

19. The latex formulation that exhibits reduced yellowing according to claim 17, wherein the base is selected from the group consisting of ammonia, ammonium hydroxide, alkylamines, dialkylamines, trialkylamines, and combinations thereof.

20. The latex formulation that exhibits reduced yellowing according to claim 17, wherein the formulation further comprises a reducing agent.

21. The latex formulation that exhibits reduced yellowing according to claim 20, wherein the reducing agent is metabisulfite dianion.

22. The latex formulation that exhibits reduced yellowing according to claim 17, wherein the polyfunctional amine is selected from the group consisting of 1,2-diaminopropane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3-diaminohexane, 4-methyl-1,3-diaminohexane, 3-methyl-1,3-diaminohexane, 2-methyl-1,3-diaminohexane, 2-methyl-1,4-diaminohexane, 3-methyl-1,4-diaminohexane, 5-methyl-1,4-diaminohexane, 2-methyl-1,5-diaminohexane, 3-methyl-1,5-diaminohexane, 4-methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations thereof.

23. The latex formulation that exhibits reduced yellowing according to claim 22, wherein the polyfunctional amine is 1,3-diaminopentane.

24. The latex formulation that exhibits reduced yellowing according to claim 17, wherein the acetoacetoxy-containing monomer is acetoacetoxyethyl methacrylate, the ethylenically unsaturated ester-containing monomer is 2-ethylhexyl acrylate, and the at least one incorporated monomer of the outer polymer layer is selected from the group consisting of methyl methacrylate, 2-ethylhexyl acrylate, methyl acrylate, and combinations thereof.

25. The latex formulation that exhibits reduced yellowing according to claim 18, wherein the diethylenically unsaturated monomer of the interstitial polymer layer is selected from the group consisting of 1,10, decanediol diacrylate, 1,9-nonanediol diacrylate, 1,8-octanediol diacrylate, 1,7-heptanediol diacrylate, 1,6-hexanediol diacrylate, 1,5-pentanediol diacrylate, 1,4-butanediol diacrylate, 1,3-pentanedioldiacrylate, 1,2-ethanediol diacrylate, and combinations thereof.

26. The latex formulation that exhibits reduced yellowing according to claim 25, wherein the diethylenically unsaturated monomer of the interstitial layer is 1,6-hexanediol diacrylate.

27. The latex formulation that exhibits reduced yellowing according to claim 26, wherein the acetoacetoxy-containing monomer of the interstitial polymer layer is acetoacetoxyethyl methacrylate.

28. A latex formulation that exhibits reduced yellowing, comprising:

(a) a base;

(b) water;

(c) a polyfinctional amine having at least two amine groups; and (d) a polymeric particle, wherein the polymeric particle comprises a polymer incorporating monomers comprising:

(i) an acetoacetoxy-containing monomer selected from the group consisting of acetoacetoxyalkyl acrylates, acetoacetoxyalkyl methacrylates, and combinations thereof;

(ii) an ethylenically unsaturated ester-containing monomer selected from the group consisting of alkyl acrylates, alkyl methacrylates and combinations thereof; and (iii) an ethylenically unsaturated monomer selected from the group of monomers consisting of vinyl aromatic monomers, acrylic acid monomers, methacrylic acid monomers, and combinations thereof, wherein the total amount of vinyl aromatic monomers is less than about 5 percent based on the total weight of the polymeric particle and the polyfunctional amine is selected from the group consisting of 1,2-diaminopropane, 1,3-diaminobutane, 1,2-iaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3-diaminohexane, 4-methyl-1,3-diaminohexane, 3-methyl-1,3-diaminohexane, 2-methyl-1,4-diaminohexane, 3-methyl-1,4-diaminohexane, 5-methyl-1,4-diaminohexane, 2-methyl-1,5-diaminohexane, 3-methyl-1,5-diaminohexane, 4-methyl-1,5-diaminohexane, 1,3-diaminoheptane, 1,4-diaminoheptane, 1,5-diaminoheptane, 1,3-diaminooctane, 1,4-diaminooctane, 1,5-aminooctane, and combinations thereof.

29. The latex formulation that exhibits reduced yellowing according to claim 28, further comprising a reducing agent.

30. The latex formulation that exhibits reduced yellowing according to claim 29, wherein the reducing agent is metabisulfite dianion.

31. The latex formulation that exhibits reduced yellowing according to claim 28, wherein the base is selected from the group consisting of ammonia, ammonium hydroxide, alkylamines, dialkylamines, trialkylamines, and combinations thereof.

32. The latex formulation that exhibits reduced yellowing according to claim 28, wherein the polyfunctional amine is 1,3-diaminopentane.

33. The latex formulation that exhibits reduced yellowing according to claim 28, wherein the total amount of vinyl aromatic monomers is less than about 1 percent based on the total weight of the polymeric particle.

34. The latex formulation that exhibits reduced yellowing according to claim 28, whe rein the acetoacetoxy-containing monomer is acetoacetoxyethyl methacrylate and the polymer comprises a monomer selected from the group consisting of 2-ethylhexyl acrylate, methyl methacrylate, and combinations thereof.

35. The latex formulation that exhibits reduced yellowing according to claim 28, wherein the polymer is essentially free of any vinyl aromatic monomers.

36. A latex formulation that exhibits reduced yellowing, comprising:
(a) a base;
(b) water;
(c) a polyfunctional amine having at least two amine groups, wherein the polyfinctional amine is selected from the group consisting of 1,2-diaminopropane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3-diaminohexane, 4-methyl-1,3-diaminohexane, 3-methyl-1,3-diaminohexane, 2-methyl-1,4-diaminohexane, 3-methyl-1,4-methyl-1,4-diaminohexane, 2-methyl-1,5-diaminohexane, 3methyl-1,5-diaminohexane, 4-methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations thereof; and
(d) a polymeric particle, wherein the polymeric particle comprises a polymer incorporating monomers comprising:
(i) an acetoacetoxy-containing monomer selected from the group consisting of acetoacetoxyalkyl acrylates, acetoacetoxyalkyl methacrylates, and combinations thereof;
(ii) an ethylenically unsaturated ester-containing monomer selected from the group consisting of alkyl acrylates, alkyl methacrylates and combinations thereof; and
(iii) an ethylenically unsaturated monomer selected from the group of monomers consisting of vinyl aromatic monomers, acrylic acid monomers, methacrylic acid monomers, and combinations thereof.

37. The latex formulation that exhibits reduced yellowing according to claim 36, further comprising a reducing agent.

38. The latex formulation that exhibits reduced yellowing according to claim 37, wherein the reducing agent is metabisulfite dianion.

39. The latex formulation that exhibits reduced yellowing according to claim 36, wherein the base is selected from the group consisting of ammonia, ammonium hydroxide, alkylamines, dialkylamines, trialkylamines, and combinations thereof.

40. The latex formulation that exhibits reduced yellowing according to claim 36, wherein the polyfunctional amine is 1,3-diaminopentane.

41. The latex formulation that exhibits reduced yellowing according to claim 36, wherein the acetoacetoxy-containing monomer is acetoacetoxyethyl methacrylate.

42. The latex formulation that exhibits reduced yellowing according to claim 36, wherein the polymer comprises a monomer selected from the group consisting of 2-ethylhexyl acrylate, methyl methacrylate, and combinations thereof.

43. The latex formulation that exhibits reduced yellowing according to claim 36 wherein the polymer further comprises a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12.

44. The latex formulation that exhibits reduced yellowing according to claim 43, wherein the diethylenically unsaturated monomer is selected from the group consisting of 1,10, decanediol diacrylate, 1,9-nonanediol diacrylate, 1,8-octanediol diacrylate, 1,7-heptanediol diacrylate, 1,6-hexanediol diacrylate, 1,5-pentanediol diacrylate, 1,4-butanediol diacrylate, 1,3-pentanedioldiacrylate, 1,2-ethanediol diacrylate, and combinations thereof.

45. The latex formulation that exhibits reduced yellowing according to claim 44, wherein the diethylenically unsaturated monomer is 1,6-hexanediol diacrylate.

46. A method for preparing a latex formulation that exhibits reduced yellowing comprising:
(a) polymerizing a mixture of monomers in the presence of a surfactant, water, and a radical polymerization initiator, to produce a polymerization mixture, the mixture of monomers comprising:
(i) an acetoacetoxy-containing monomer selected from the group consisting of acetoacetoxyalkyl acrylates, acetoacetoxy methacrylates, or combinations thereof;
(ii) an ethylenically unsaturated ester-containlng monomer selected from the group consisting of alkyl acrylates, alkyl methacrylates, and combinations thereof; and (iii) an ethylenically unsaturated monomer selected from the group of monomers consisting of vinyl aromatic monomers, acrylic acid monomers, methacrylic acid monomers, and combinations thereof, wherein total amount of vinyl aromatic monomers is less than about 5 percent based on the total weight of monomers;

(b) mixing a base with the polymerization mixture; and (c) mixing a diamne with the polymerization mixture, the diamine selected from the group consisting of 1,2-diamiropane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diamlnopentane, 2,4-diaminopentane, 2,5-diaminohexane, 2,4-diaminohexane, 1,3-diaminohexane, 1,4-diaminohexme, 1,5-diaminohexae, 5-methyl-1,3-diaminohexane, 4-methyl-1,3-diaminohexane, 3-methyl-1,3-diaminohexane, 2-methyl-1,4-diaminohexane, 3-methyl-1,4-diaminohexane, 5-methyl-1,4-diaminohexane, 2-methyl-1,5-diaminohexane, 3-methyl-1,5-diaminohexane, 4-methyl-4-methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations thereof.

47. The method for preparing a latex formulation that exhibits reduced yellowing according to claim 46, wherein the total amount of vinyl aromatic monomers is less than about 1 percent based on the total weight of monomers.

48. The method for preparing a latex formulation that exhibits reduced yellowing according to claim 46, wherein the mixture of monomers is essentially free of any vinyl aromatic monomers.

49. The method for preparing a latex formulation that exhibits reduced yellowing according to claim 46, further comprising mixing a reducing agent with the polymerization mixture.

50. The method for preparing a latex formulation that exhibits reduced yellowing according to claim 49, wherein the reducing agent is metabisulfite dianion.

51. The method for preparing a latex formulation that exhibits reduced yellowing according to claim 46, wherein the base is selected from the group consisting of ammonia, ammonium hydroxide, and combinations thereof.

52. The method for preparing a latex formulation that exhibits reduced yellowing according to claim 46, wherein the temperature is maintained at from about 70° C. to about 90° C. during the polymerization.

53. The method for preparing a latex formulation that exhibits reduced yellowing according to claim 46, wherein the surfactant is lauryl sulfate anion.

54. The method for preparing a latex formulation that exhibits reduced yellowing according to claim 46, wherein the mixture of monomers further comprises a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12.

55. The method for preparing a latex formulation that exhibits reduced yelowing according to claim 46, wherein the diamine is 1,3-diaminopentane.

56. A method for preparing a latex formulation that exhibits reduced yellowing comprising:

(a) polymerizing a mixture of monomers in the presence of a surfactant, water, and a radical polymerization initiator to produce a polymerization mixture, the mixture of monomers comprising:

(i) an acetoacetoxy-contajnjg monomer selected from the group consisting of acetoacetoxyalkyl acrylates, acetoacetoxy methacrylates, or combinations thereof;

(ii) an ethylenically unsaturated ester-containing monomer selected from the group consisting of alkyl acrylates, alkyl methacrylates, and combinations thereof; and (iii) an ethylenically unsaturated monomer selected from the group of monomers consisting of vinyl aromatic monomers, acrylic acid monomers, methacrylic acid monomers, and combinations thereof;

(b) mixing a base with the polymerization mixture; and (c) mixing a diamine with the polymerization mixture, the diamine selected from the group consisting of 1,2-diaminopropane, 1,3-diaminobutane, 1,2-diaminobutane, 1,3-diaminopentane, 1,4-diaminopentane, 4-methyl-1,3-diaminopentane, 2-methyl-1,3-diaminopentane, 2-methyl-1,4-diaminopentane, 3-methyl-1,4-diaminopentane, 2,4-diaminopentane, 2,5-diaminohexane, 2,4-diaminohexane, 1,3-diaminohexane, 1,4-diaminohexane, 1,5-diaminohexane, 5-methyl-1,3-diaminohexane, 4-methyl-1,3-diaiinohexane, 3-methyl-1,3-diaminohexane, 2-methyl-1,4-diaminohexane, 3-methyl-1,4-diaminohexane, 5-methyl-1,4-diaminohexane, 2-methyl-1,5-diaminohexane, 3-methyl-1,5-diaminohexane, 4 methyl-1,5-diaminohexane, 1,3-diaminoheptane, 1,4-diaminoheptane, 1,5-diaminoheptane, 1,3-diaminooctane, 1,4-diaminooctane, 1,5-diaminooctane, and combinations thereof.

57. The method for preparing a latex formulation that exhibits reduced yellowing according to claim 56, further comprising mixing a reducing agent with the polymerization mixture.

58. The method for preparing a latex formulation that exhibits reduced yellowing according to claim 57, wherein the reducing agent is metabisulfite dianion.

59. The method for preparing a latex formulation that exhibits reduced yellowing according to claim 56, wherein the base is selected from the group consisting of ammonia, ammonium hydroxide, and combinations thereof.

60. The method for preparing a latex formulation that exhibits reduced yellowing according to claim 56, wherein the temperature is maintained at from about 70° C. to about 90° C. during the polymerization.

61. The method for preparing a latex formulation that exhibits reduced yellowing according to claim 56, wherein the surfactant is lauryl sulfate anion.

62. The method for preparing a latex formulation that exhibits reduced yellowing according to claim 56, wherein the mixture of monomers further comprises a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12.

63. The method for preparing a latex formulation that exhibits reduced yellowing according to claim 56, wherein the diamine is 1,3-diaminopentane.

64. A method for preparing a polymeric particle that exhibits reduced yellowing, comprising:

(a) polymerizing a first monomer mixture in the presence of a seed latex polymer, a surfactant, water, and a radical polymerization initiator to form an inner polymer layer, the first monomer mixture comprising:
  (i) an acetoacetoxy-containing monomer selected from the group consisting of acetoacetoxyalkyl acrylates, acetoacetoxyalkyl methacrylates, and combinations thereof;
  (ii) an ethylenically unsaturated ester-containing monomer selected from the group consisting of alkyl acrylates, alkyl methacrylates and combinations thereof; and
  (iii) an ethylenically unsaturated monomer selected from the group of monomers consisting of vinyl aromatic monomers, acrylic acid monomers, methacrylic acid monomers, and combinations thereof; and
(b) subsequently polymerizing a second monomer mixture in the presence of the surfactant, the radical polymerization initiator, and the inner polymer layer, the second monomer mixture comprising a monomer selected from the group of monomers consisting of vinyl aromatic monomers, alkyl acrylates, alkyl methacrylates, and combinations thereof, wherein the total amount of vinyl aromatic monomers is less than about 5 percent based on the total weight of the second monomer mixture.

65. The method for preparing a polymeric particle that exhibits reduced yellowing according to claim 64, wherein the total amount of the vinyl aromatic monomers is less than about 1 percent based on the total weight of the 4 second monomer mixture.

66. The method for preparing a polymeric particle that exhibits reduced yellowing accor ding to claim 65, wherein the second monomer mixture is essentially free of the vinyl aromatic monomers.

67. The method for preparing a polymeric particle that exhibits reduced yellowing according to claim 64, further comprising polymerizing a third monomer m ixture in the presence of the inner polymer layer, the surfactant, and the radical polymerization initiator to produce an interstitial polymer layer, the third monomer m ixture comprising:
  (a) an acetoacetoxy-containing monomer selected from the group consisting of acetoace toxyalkyl acrylates, acetoacetoxyalkyl methacrylates, and combinations thereof;
  (b) an ethylenically unsaturated ester-containing monomer selected from the group consisting of alkyl acrylates, aakyl methacrylates and combinations thereof; and
  (c) a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12; wherein the second monomer mixture is polymerized in the presence of the interstitial polymer layer.

68. A method for preparing a latex formulation comprising mixing a base selected from the group consisting of ammonia, ammonium hydroxide, and mixtures thereof; and a polyfunctional amine having at least two amine groups with the polymeric particle of any of claims 64–67.

69. The method for preparing a latex formulation according to claim 68, wherein one of the two amine groups of the polyfunctional amine is bonded to a first carbon atom and a second amine group is bonded to a second carbon atom and 3 or less or 6 or more carbon atoms separate the first carbon atom from the second carbon atom in the polyfunctional amine.

70. A method for preparing a latex formulation that exhibits reduced yellowing, comprising:
  (a) preparing an aqueous polymeric particle dispersion by
    (i) polymerizing a first monomer mixture in the presence of a seed latex polymer, water, a surfactant, and a radical polymerization initiator to form an inner polymer layer, the first monomer mixture comprising: an acetoacetoxy-containing monomer selected from the group consisting of acetoacetoxyalkyl acrylates, acetoacetoxyalkyl methacrylates, and combinations thereof; an ethylenically unsaturated ester-containing monomer selected from the group consisting of alkyl acrylates, alkyl methacrylates and combinations thereof; and an ethylenically unsaturated monomer selected from the group of monomers consisting of vinyl aromatic monomers, acrylic acid monomers, methacrylic acid monomers, and combinations thereof; and
    (ii) subsequently polymerizing a second monomer mixture in the presence of the surfactant, the radical polymerization initiator, and the inner polymer layer, the second monomer mixture comprising a monomer selected from the group consisting of vinyl aromatic monomers, alkyl acrylates, alkyl methacrylates, and combinations thereof;
  (b) mixing with the aqueous polymeric particle dispersion, a base and a polyfunctional amine having at least two amine groups, wherein one of the two amine groups of the polyfunctional amine is bonded to a first carbon atom and a second amine group is bonded to a second carbon atom and 3 or less or 6 or more carbon atoms separate the first carbon atom from the second carbon atom in the polyfunctional amine.

71. The method for preparing a latex formulation that exhibits reduced yellowing according to claim 70, wherein the base is selected from the group consisting of ammonia, ammonium hydroxide, and combinations thereof.

72. The method for preparing a latex formulation that exhibits reduced yellowing according to claim 70, further comprising polymerizing a third monomer mixture in the presence of the inner polymer layer, the water, the surfactant, and the radical polymerization initiator to produce an interstitial polymer layer, the third monomer mixture comprising:
  (a) an acetoacetoxy-containing monomer selected from the group consisting of acetoacetoxyalkyl acrylates, acetoacetoxyalkyl methacrylates, and combinations thereof;
  (b) an ethylenically unsaturated ester-containing monomer selected from the group consisting of alkyl acrylates, alkyl methacrylates and combinations thereof; and
  (c) a diethylenically unsaturated monomer having the formula $CH_2=C(R_1)-C(=O)-O-CH_2-[CH_2]_n-CH_2-O-C(=O)-C(R_2)=CH_2$, wherein $R_1$ and $R_2$ are independently selected from the group consisting of H, and alkyl groups having from 1 to 5 carbon atoms, and n is an integer ranging from 0 to 12; wherein the second monomer mixture is polymerized in the presence of the interstitial polymer layer.

* * * * *